United States Patent
Kaito et al.

(10) Patent No.: US 8,703,041 B2
(45) Date of Patent: Apr. 22, 2014

(54) REFORMED ALUMINUM NITRIDE SINTERED BODY AND METHOD OF PRODUCING THE SAME

(75) Inventors: Yuriko Kaito, Shunan (JP); Yukihiro Kanechika, Shunan (JP); Masanobu Azuma, Shunan (JP)

(73) Assignee: Tokuyama Corporation, Shunan-Shi (JP)

(*) Notice: Subject to any disclaimer, the term of this patent is extended or adjusted under 35 U.S.C. 154(b) by 290 days.

(21) Appl. No.: 12/676,033

(22) PCT Filed: Sep. 2, 2008

(86) PCT No.: PCT/JP2008/065710
§ 371 (c)(1),
(2), (4) Date: Mar. 2, 2010

(87) PCT Pub. No.: WO2009/031510
PCT Pub. Date: Mar. 12, 2009

(65) Prior Publication Data
US 2010/0183860 A1 Jul. 22, 2010

(30) Foreign Application Priority Data

Sep. 3, 2007 (JP) .................................. 2007-228099
Jun. 10, 2008 (JP) .................................. 2008-151949

(51) Int. Cl.
*C04B 14/32* (2006.01)

(52) U.S. Cl.
CPC .................................. *C04B 14/326* (2013.01)
USPC ....................................................... 264/668

(58) Field of Classification Search
USPC ....................................................... 264/668
See application file for complete search history.

(56) References Cited

U.S. PATENT DOCUMENTS 7,081,425 B2 7/2006 Kanechika et al.
2005/0070421 A1* 3/2005 Kanechika et al. .......... 501/98.4

FOREIGN PATENT DOCUMENTS

| JP | 2-026871 A | 1/1990 |
| JP | 4-370644 A | 12/1992 |
| JP | 2005-119953 A | 5/2005 |
| WO | WO-2007/026788 A1 | 3/2007 |

OTHER PUBLICATIONS

Machine translation of WO 2007/026788.*
Kuramoto, N. & Taniguchi, H. "Transparent AlN ceramics." J. of Materials Sci Letters, Jun. 1984, vol. 3, Issue 6, pp. 471-474.*

* cited by examiner

Primary Examiner — Joseph S Del Sole
Assistant Examiner — Russell Kemmerle, III
(74) Attorney, Agent, or Firm — Birch, Stewart, Kolasch & Birch, LLP (57) ABSTRACT

[Problems] To provide a method of producing, easily and in a high yield, a reformed aluminum nitride sintered body having very excellent light transmission property which can be favorably used as a light-transmitting cover particularly for light sources having high luminous efficiencies. [Means for Solution] An aluminum nitride sintered body having a concentration of metal impurities excluding aluminum of not more than 150 ppm, an oxygen concentration of not more than 0.5% by weight and a relative density of not less than 95% is used as a starting material. The aluminum nitride sintered body is heat-treated in an oxidizing atmosphere in a temperature region of 1400 to 2000° C. to increase the oxygen concentration by not less than 0.03% by weight.

2 Claims, 1 Drawing Sheet

REFORMED ALUMINUM NITRIDE SINTERED BODY AND METHOD OF PRODUCING THE SAME

TECHNICAL FIELD

This invention relates to a method of producing a reformed aluminum nitride sintered body having improved light transmission property that can be favorably used as a light-transmitting cover of a light source having a high luminous efficiency and to a reformed aluminum nitride obtained by this method.

BACKGROUND ART

As light-transmitting materials, so far, materials transparent to visible light, such as transparent resin, glass, quartz and light-transmitting alumina have been selectively used depending upon the limitations such as an environment in which they are used, cost and the like. For instance, a transparent resin or a glass is used as a cover (window material) for a light source having a low energy intensity and as a light-transmitting material for transmitting light of wavelengths without almost containing ultraviolet rays. As a light-transmitting cover used for a light source that contains some amounts of ultraviolet rays or a light source which has a large energy intensity and of which the temperature becomes high, there is used a material comprising quartz or alumina. As a light-transmitting cover used for a light source that uses a corrosive gas such as halogen gas, further, there is used an alumina material having a large resistance against corrosion.

However, limitation is often imposed on the material used as the light-transmitting material due to an increase in the amount of heat accompanying an increase in the brightness of the light source. For example, the alumina material has resistance against the halogen gas. Concerning the radiation of heat, however, it has a thermal conductivity of as small as 30 W/mK and cannot fully radiate the heat from the light source which, therefore, may shorten the life of the members of the light source.

From the above point of view, an aluminum nitride sintered body is drawing attention as a light-transmitting material because of its favorable heat resistance and heat conducting property as well as excellent corrosion resistance against the halogen gas. However, this sintered body has a lower light transmission factor than those of other light-transmitting materials. Therefore, a variety of reformed aluminum nitride sintered bodies having improved light-transmitting property have been proposed.

For example, a patent document 1 proposes a method of producing an aluminum nitride sintered body by using, as a starting material, an aluminum nitride powder having a fine particle diameter and containing little metal impurities, and firing the aluminum nitride powder in an inert atmosphere at 1700 to 2100°C. The aluminum nitride sintered body obtained by this method exhibits a light transmission factor of 60 to 75% over a wavelength range of 0.2 μm to 30 μm.

Further, a patent document 2 discloses an aluminum nitride sintered body having an oxygen concentration of not more than 400 ppm, a concentration of metal impurities of not more than 150 ppm and a carbon concentration which is suppressed to be not more than 200 ppm, and an average crystal particle diameter of 2 μm to 20 μm. With this sintered body, the gradient of a spectral curve is not less than 1.0 (%/nm) with a thickness of 0.3 mm over a wavelength region of 260 to 300 nm, a total light transmission factor is not less than 86% over a wavelength region of 400 to 800 nm, and a wavelength with which the total light transmission factor reaches 60% in the spectrum is not longer than 400 nm.

Patent document 1: JP-A-2-26871
Patent document 2: JP-A-2005-119953

DISCLOSURE OF THE INVENTION

Problems that the Invention is to Solve

One of means for improving light transmission property of the aluminum nitride sintered body is to decrease impurities in the grain boundaries. That is, the aluminum nitride by its own nature has a band gap of as large as about 6.2 eV and absorbs no visible light if it is completely crystalline. Upon suppressing absorption or scattering of light caused by impurities in the grain boundaries, therefore, the aluminum nitride can ensure its essentially high light transmission property. Based on this point of view, the patent document 1 tries to improve light transmission property of the aluminum nitride.

However, the aluminum nitride sintered body contains oxygen which is an impurity of the greatest account. Oxygen partly and solidly dissolves in the crystal particles of aluminum nitride and, presumably, defects are occurring in the crystal particles due to solidly dissolved oxygen and are absorbing visible light causing the light transmission property to be lowered. For example, the patent document 1 sinters a starting powder that contains metal impurities in greatly decreased amounts. However, the amount of oxygen in the starting powder has not been so decreased that the aluminum nitride crystal particles in the obtained sintered body contain much defects caused by the solidly dissolved oxygen. Therefore, the aluminum nitride sintered body of the patent document 1 exhibits a high transmission factor for the light in a long wavelength region but exhibits a low light transmission factor in the visible light region (300 to 800 nm).

From the above point of view, the patent document 2 attempts to greatly lower the oxygen concentration in addition to lowering the contents of metal impurities in the sintered body. The aluminum nitride sintered body, therefore, suppresses the absorption of visible light caused by impurities in the crystal grain boundaries and by defects in the crystals, and shows a high light transmission property for the visible light.

As described above, the light transmission property of the known aluminum nitride sintered bodies has heretofore been improved chiefly by lowering the concentration of metal impurities and the oxygen concentration, and by heightening the purity. According to the patent document 2, in particular, the light transmission factor is improved by decreasing oxygen which is an impurity of the greatest account in the aluminum nitride sintered body down to not more than 400 ppm.

As is well known, however, the aluminum nitride sintered body unavoidably contains oxygen which is an impurity of the greatest account. In the production on an industrial scale, in particular, it is very difficult to control the oxygen concentration in the aluminum nitride sintered body to lie in a range of, for example, not more than 400 ppm maintaining a high yield, and it is quite difficult to obtain an aluminum nitride sintered body having a high transmission factor maintaining stability.

It is, therefore, an object of the present invention to provide a method of producing a reformed aluminum nitride sintered body having improved light transmission property without controlling the oxygen concentration in the aluminum nitride sintered body to be very low.

Another object of the present invention is to provide a reformed aluminum nitride sintered body which exhibits a high light transmission property for the visible light despite the oxygen concentration has not been much lowered. Here, the oxygen concentration in the invention stands for oxygen contained in the whole sintered body that is found by a high-temperature thermal analytical method by polishing the surfaces of the obtained reformed aluminum nitride sintered body and, thereafter, pulverizing the sintered body.

Means for Solving the Problems

In order to achieve the above objects, the present inventors have forwarded the study, have newly discovered the fact that the light transmission property can be greatly improved and, particularly, the total light transmission factor can be greatly improved in the visible light region by solidly dissolving oxygen in a particular range of high temperatures by the heat treatment without suppressing the oxygen concentration in the aluminum nitride sintered body to be low but rather heightening the oxygen concentration contrary to the traditional technology, and have completed the invention.
Namely, according to the present invention, there is provided a method of producing a reformed aluminum nitride sintered body including following steps:
 preparing, as a starting material, an aluminum nitride sintered body obtained by firing in a reducing atmosphere and having a concentration of metal impurities excluding aluminum of not more than 150 ppm, an oxygen concentration of not more than 0.5% by weight and a relative density of not less than 95%, and
 heat-treating said aluminum nitride sintered body in an oxidizing atmosphere in a temperature region of 1400 to 2000° C. in a manner that the aluminum nitride sintered body does not come in contact with oxygen at temperatures of not lower than 600° C. but lower than 1400° C.
In the production method of the present invention, it is desired that:
(1) The aluminum nitride sintered body is held in a non-oxidizing atmosphere, the temperature of the non-oxidizing atmosphere is elevated to heat the aluminum nitride sintered body and when the temperature of the non-oxidizing atmosphere has reached a temperature region of 1400 to 2000° C., the non-oxidizing atmosphere is changed over to an oxidizing atmosphere to execute said heat-treating in the oxidizing atmosphere;
(2) The temperature of the non-oxidizing atmosphere is elevated while holding the aluminum nitride sintered body and an oxygen feed source that releases oxygen at the heat-treating temperature in the non-oxidizing atmosphere, to thereby change the non-oxidizing atmosphere into the oxidizing atmosphere;
(3) The oxygen feed source is at least one kind of inorganic oxide selected from the group consisting of yttrium aluminate, magnesium oxide and alumina;
(4) The aluminum nitride sintered body used as the starting material is obtained by firing a molded body in a reducing atmosphere at a temperature of 1600 to 2000° C. for not less than 3 hours, the molded body containing an aluminum nitride powder that has a concentration of metal impurities of not more than 50 ppm and an oxygen concentration of not more than 1% by weight and a sintering additive;
(5) The sintering additive contains an easily volatile component having a vapor pressure at 1600° C. of not less than $10^{-4}$ Pa in an amount of not less than 10% by weight, and is used in an amount of 0.1 to 7 parts by weight per 100 parts by weight of the aluminum nitride powder; and (6) The oxygen concentration is increased by not less than 0.03% by weight by said heat-treating in the oxidizing atmosphere.

According to the present invention, further, there is provided a reformed aluminum nitride sintered body having a concentration of metal impurities of not more than 150 ppm, an oxygen concentration in a range of not less than 0.08% by weight, a relative density of not less than 95% and a total light transmission factor over a wavelength region of 300 to 800 nm of not less than 67% as measured in as a flat plate having a thickness of 0.6 mm.
In the reformed aluminum nitride sintered body of the invention, it is desired that:
(1) The rectilinear light transmission factor is not less than 10% for light having a wavelength of 600 nm as measured as a flat plate having a thickness of 0.3 mm; and
(2) An average crystal particle diameter is not smaller than 35 μm.

Effects of the Invention

According to the method of the present invention, a reformed aluminum nitride (AlN) sintered body having improved light transmission property can be obtained by the heat treatment in the oxidizing atmosphere in a particular temperature region (1600 to 2000° C.) as described above. With the AlN sintered body of the shape of a flat plate having a thickness of 0.6 mm as demonstrated in Examples appearing later, for example, a total light transmission factor over a wavelength region of 300 to 800 nm becomes not less than 67%. With the AlN sintered body of a cylindrical shape having the same thickness, the total light transmission factor, generally, reaches not less than 95% though it varies depending upon the diameter. The AlN sintered body of the cylindrical shape exhibits a strikingly improved total light transmission factor since the reflected light falls again on the sintered body to amplify the light.
According to the present invention, oxygen solidly dissolves in the AlN crystal particles in the AlN sintered body due to the heat treatment and, as a result, light transmission property is improved. Namely, the invention employs means which is quite contrary to the widely known method of improving light transmission property by lowering the oxygen concentration in the AlN sintered body. Though the reason has not been clarified yet why the AlN sintered body exhibits improved light transmission property through the heat treatment, the inventors speculate that when oxygen is solidly dissolved in the crystal particles in the particular temperature range described above, defects are newly formed due to oxygen that is newly and solidly dissolved causing a change in the overall form of defects stemming from oxygen, and defects absorbing visible light are transformed into defects that do not absorb visible light.
According to the present invention as will be learned from the above description, light transmission property is improved by solidly dissolving oxygen without lowering the oxygen concentration. This makes it possible to use an AlN sintered body having a high oxygen concentration, which is the greatest advantage of the invention. Namely, oxygen is an impurity which most easily and unavoidably infiltrates into the AlN sintered body in the step of its production, and it is very difficult to control the oxygen concentration to be low. The AlN sintered body having a low oxygen concentration can be produced in a low yield and, therefore, the cost of production becomes very high. According to the present invention, on the other hand, the upper limit of allowable oxygen concentration of the AlN sintered body used for the treatment is 0.5% by weight (5000 ppm). To improve the light transmission property to a degree comparable to that of the present invention according to the conventional technology, it is necessary to use an AlN powder having an oxygen concentration very lower than that of the present invention.

As described above, the present invention improves the light transmission property of the AlN sintered body having a high oxygen concentration and offers very great industrial advantage.

According to the present invention, further, the heat treatment is conducted in the oxidizing atmosphere for extended periods of time (e.g., 100 hours or longer) to increase the oxygen concentration in the sintered body (preferably, to be not less than 0.03% by weight) to markedly improve the rectilinear light transmission factor while maintaining the total light transmission factor of the AlN sintered body at a high level. The rectilinear light transmission factor represents the ratio of light transmitting straight through without being refracted in the sintered body. Through the heat treatment over an extended period of time as described above, the AlN crystal particles grow and as a result, rectilinear light transmission property is improved strikingly. With the AlN sintered body of the shape of a plate having a thickness of 0.3 mm, for example, the rectilinear light transmission factor for light having a wavelength of 600 nm increases to not less than 10% through the heat treatment conducted for an increased period of time as described above.

The reformed aluminum nitride sintered body of the invention obtained by the above production method has a concentration of metal impurities suppressed to be not more than 150 ppm, exhibits a high light transmission property even when its oxygen concentration is adjusted to be as high as, for example, not less than 0.08% by weight, and exhibits a total light transmission factor over a wavelength region of 300 to 800 nm of not less than 67% as measured in the form of a flat plate having a thickness of 0.6 mm. The conventional aluminum nitride sintered body that exhibits light transmission property comparable to that of the present invention must have a very low oxygen concentration as taught in the patent document 2, and is radically different from the reformed aluminum nitride sintered body of the present invention.

DESCRIPTION OF REFERENCE NUMERALS

1: integrating sphere
2: sample
3: cap
4: sample support portion
5: optical fiber
6: light source
7: detector
8: display unit
9: buffer board
10: apparatus for measuring light transmission factor

BEST MODE FOR CARRYING OUT THE INVENTION

<Starting Aluminum Nitride Sintered Body>

In the production method of the present invention, it is desired that the aluminum nitride sintered body used as the starting material for being heat-treated in an oxidizing atmosphere that will be described later, has a concentration of metal impurities of not more than 150 ppm and, particularly, not more than 100 ppm for realizing a high visible light transmission property. That is, upon using the aluminum nitride having such a low concentration of metal impurities, the concentration of metal impurities in the obtained reformed AlN sintered body becomes of the same level making it possible to suppress the absorption and scattering of light caused by impurities in the crystal grain boundaries and to improve light transmission property.

The concentration of metal impurities stands for a concentration of metal elements excluding aluminum calculated as metals. Concretely, it stands for a concentration of metal impurities stemming from the aluminum nitride powder used for the production of the AlN sintered body and of metals stemming from a sintering additive used for the sintering and other additives (e.g., assisting agent volatilization-promoting substance that will be described later). Al is excluded. This is because it is difficult to determine Al that is forming AlN separately from Al of $Al_2O_3$ that is present, for example, in the surface of the sintered body. Here, however, Al which is an impurity is present in the form of a compound to which oxygen is bonded, and is, therefore, adjusted by the oxygen concentration as described below.

It is, further, important that the aluminum nitride sintered body used as the starting material has an oxygen concentration of not more than 0.5% by weight and, preferably, not more than 0.2% by weight for realizing a high visible light transmission property. That is, if the oxygen concentration is high, there are present much defects stemming from oxygen solidly dissolved in the AlN crystal particles, absorption of visible light by defects becomes distinct and, as a result, it becomes difficult to obtain a high visible light transmission property. Further, the amount of Al impurity increases with an increase in the oxygen concentration, and the light transmission property is deteriorated even by the scattering due to Al impurity.

According to the present invention, on the other hand, the amount of the solidly dissolved oxygen is increased by the heat treatment in the oxidizing atmosphere that will be described later. Therefore, there is no need of greatly lowering the oxygen concentration, no load is exerted at the time of production, and oxygen may be contained in such amounts that do not cause a conspicuous decrease in the yield or does not cause an increase in the cost of production. From the above point of view, oxygen may, desirably, be contained at concentrations of, for example, not less than 500 ppm (0.05% by weight) and, particularly, not less than 800 ppm.

It is, further, important that the AlN sintered body has a relative density of not less than 95%. If the relative density is low, voids increase in the sintered body causing the ray of light to be scattered and, therefore, the transmission factor to be lowered.

<Production of the Starting Aluminum Nitride Sintered Body>

The AlN sintered body of which the concentration of metal impurities and the oxygen concentration are adjusted as described above and which is so dense as to have a relative density of not less than 95%, can be produced by firing an aluminum nitride powder by a known method in a reducing atmosphere.

For example, a molded body containing an aluminum nitride powder and a sintering additive is prepared, and is fired in a reducing atmosphere at a temperature of 1600 to 2000° C. for not less than 3 hours to thereby obtain an AlN sintered body that can be used as a starting material.

—Aluminum Nitride Powder—

The aluminum nitride powder that is used is the one having a concentration of metal impurities of not more than 50 ppm, an oxygen concentration of not more than 1% by weight and a purity of not less than 98% by weight. Here, it is desired that a carbon concentration, too, has been adjusted to be not more than 0.1% by weight. Further, though not particularly limited, the powder, usually, has an average particle diameter ($D_{50}$) of about 0.5 to about 20 µm calculated as volume as measured by a laser diffraction scattering method.

—Sintering Additive—

The sintering additive is used for promoting the sintering to obtain a densely sintered body having a high relative density, i.e., used in an amount of 0.1 to 7 parts by weight and, particularly, 0.5 to 5 parts by weight per 100 parts by weight of the aluminum nitride powder. Though there is no particular limitation, it is desired to use an easily volatile sintering additive that produces a vapor pressure at 1600° C. of not lower than $10^{-4}$ Pa to obtain the above AlN sintered body having a high purity and a low concentration of metal impurities. The easily volatile sintering additive not only promotes the sintering but also tends to remain little in the sintered body, and is particularly suited for obtaining a sintered body having a low concentration of metal impurities.

Concrete examples of the volatile sintering additive include alkaline earth compounds such as calcium carbonate, calcium nitrate, calcium phosphate, calcium oxide and strontium oxide, as well as rare earth compounds such as yttrium carbonate, yttrium nitrate, yttrium oxide, cerium oxide, holmium oxide, ytterbium oxide, gadolinium oxide, neodymium oxide, samarium oxide and dysprosium oxide. These volatile sintering additives may be used in one kind alone or in a combination of two or more kinds.

The above volatile sintering additive may be used in combination with other sintering additives. In that case, attention should be so given to that the impurity metal concentration does not lie in the above-mentioned range. For instance, it is desired that not less than 10% by weight and, particularly, not less than 30% by weight of the whole sintering additives is the volatile sintering additive.

Though there is no particular limitation, the sintering additive becomes highly active and more volatile when their particle diameters are, usually, small. It is, therefore, desired that the sintering additive has a particle diameter which is not larger than 5 µm and, particularly, not larger than 3 µm.

—Preparation of the Molded Body—

The molded body containing the aluminum nitride powder and the sintering additive powder is obtained by molding a mixture of these powders by a known means.

The aluminum nitride powder and the sintering additive powder are mixed together by using a mixer such as ball mill or the like by either a dry method or a wet method. When mixed by the wet method, a dispersion medium is used, such as water, alcohols or hydrocarbons. From the standpoint of dispersion, however, it is desired to use alcohols or hydrocarbons.

The molded body containing the above mixed powder must have a strength to some extent for mass-producing the aluminum nitride sintered body. To maintain the strength, it is desired to use an organic binder, add the organic binder to the mixed powder to prepare a composition for molding, mold the composition into a predetermined shape, and dewax.

The organic binder is used in an amount of 0.1 to 30 parts by weight and, particularly, 1 to 15 parts by weight per 100 parts by weight of the aluminum nitride powder.

Representative examples of the organic binder are butyral resins such as polyvinyl butyral, etc. and acrylic resins such as butyl polymethacrylate, etc. Not being limited thereto only, however, there can be used any other known organic binders.

As required, further, dispersants such as glycerin compounds and plasticizers such as phthalic acid esters may be added to the composition for molding.

The molded body may assume a suitable shape depending upon the use, and is molded by suitable means depending on the shape thereof. To obtain the molded body in the shape of a sheet, for example, the doctor blade method is, usually, employed.

Prior to being fired in the reducing atmosphere, the molded body containing the organic binder is heated in any atmosphere such as in the air, nitrogen or hydrogen and is dewaxed. The dewaxing temperature may differ depending on the kind of the organic binder but is, desirably, 300 to 900° C. and is, particularly, 300 to 700° C. Carbon remains in the molded body after dewaxed, usually, in an amount of about 300 to about 5000 ppm.

To prepare a molded body without using the organic binder, preferably, the mixed powder of the aluminum nitride powder and the sintering additive powder is compression-molded to thereby prepare the molded body. The compression molding is conducted by, for example, false-molding the mixed powder by using a mono-axial extruder and, thereafter, effecting the pressure molding by using a CIP (cold isostatic press) molding machine under 1 to 4 t/cm².

—Firing in a Reducing Atmosphere—

The molded body that is dewaxed and compression-molded as described above is fired in a reducing atmosphere. Due to the firing, the sintering additive is efficiently removed simultaneously with the sintering, and a dense and highly pure AlN sintered body is obtained.

The firing in the reducing atmosphere can be easily conducted by, for example, putting the molded body and a carbon source into a predetermined container, and elevating the interior of the container to a predetermined temperature to heat the molded body. From the standpoint of increasing the density of the sintered body and promoting the volatilization of the assisting agent, it is, particularly, desired to use a sealed container as the above container.

As the carbon source, further, there can be used solid carbon of various forms, such as the one of the form of powder, fiber, felt, sheet or plate.

It is, further, desired that the molded body and the carbon source are held in the container in a manner of not in contact with each other from the stand of easily controlling the density and surface roughness of the obtained sintered body. To hold the molded body and the carbon source in a manner of not in contact with each other, further, it is desired to arrange a plate comprising boron nitride or aluminum nitride sintered body between them. In the sealed container, in particular, it is desired that a space holding the carbon source and a space holding the molded body are partitioned to a degree that permits the flow of atmosphere for obtaining an aluminum nitride sintered body having a high density and in which the additive is remaining in small amounts.

The firing in the reducing atmosphere is conducted at a temperature of 1500 to 2000° C. for not less than 3 hours and, preferably, for 10 to 50 hours in order to obtain the aluminum nitride sintered body having the above-mentioned relative density, concentration of metal impurities and oxygen concentration.

<Heat Tin an Oxidizing Atmosphere>

In the production method of the present invention, the AlN sintered body obtained as described above is heat-treated in an oxidizing atmosphere in a temperature region of 1400 to 2000° C. and, preferably, 1600 to 1800° C. to thereby obtain a reformed aluminum nitride sintered body in which oxygen is solidly dissolved in the AlN crystal particles and featuring improved visible light transmission property.

The above heat treatment in the oxidizing atmosphere can be conducted continuing the above production of the AlN sintered body. However, it involves difficulty to conduct the heat treatment in the oxidizing atmosphere continuing the firing in the reducing atmosphere. Usually, therefore, the obtained AlN sintered body is taken out from the container, transferred into another container and, thereafter, the heat treatment is conducted in the oxidizing atmosphere. In this case, if the AlN sintered body comes in contact with oxygen in a temperature region of not lower than 600° C. but lower than 1400° C., Al is oxidized on the surface of the sintered body to form an alumina film thereon. At the time of heat treatment in the oxidizing atmosphere, therefore, oxygen diffuses little into the sintered body making it difficult to obtain the reformed AlN sintered body having a high light transmission property. In order to prevent the contact with oxygen in the above temperature range, therefore, it is necessary that the AlN sintered body held in the reducing atmosphere is cooled down to room temperature and is, thereafter, taken out from the container, held in the non-oxidizing atmosphere, and is heated up to a temperature region for heat treatment.

Here, it is desired that the non-oxidizing atmosphere has an oxygen partial pressure of not larger than $10^{-4}$ Pa. Such an atmosphere can be formed by transferring the AlN sintered body to be heat-treated into a predetermined container, and substituting the interior of the container with an inert gas such as nitrogen, argon, etc.

As the container for containing the AlN sintered body to be heat-treated, it is desired to use the one made from a sintered body such as aluminum nitride sintered body or boron nitride sintered body, or the one made from a non-carbonaceous material having heat resistance, such as molybdenum [Mo], etc. Among them, it is desired to use a container made from a sintered body such as aluminum nitride sintered body or boron nitride sintered body from the standpoint of durability.

The container does not have to be all constituted by using the above material. For instance, the inner surface of the carbonaceous container may be covered with the above non-carbonaceous material that does not permit the transmission of gas.

The heat treatment in the oxidizing atmosphere is, usually, carried out by installing the container holding the AlN sintered body therein in a carbon furnace to heat it. It is, therefore, desired that the container is tightly sealed so that a reducing gas containing carbon will not flow therein during the heat treatment in the oxidizing atmosphere.

For instance, it is desired that the material constituting the container wall has a gas permeability of not larger than 0.06× $10^{-6}$ mols/m$^2$·s·Pa. When the container uses a lid, further, it is desired that the lid and the main body are closely contacted with smooth surfaces having an average surface roughness (Rz, JIS B 0601-1994) of not larger than 3 μm to maintain sealing. That is, a sealed container with lid has heretofore been often used for sintering the aluminum nitride. In this case, however, the surfaces on where the lid and the container are in contact have an average surface roughness in excess of 5 μm, which is not suited for conducting the treatment of the present invention.

To seal the lid and the container main body together, a continuous groove is formed in the sealing surface along the whole circumference of either the main body or the container, a continuous protruding portion is formed on the other sealing surface so as to be fitted to the groove; i.e., they are fitted together to maintain sealing.

In the invention, the temperature of atmosphere in the space where the AlN sintered body is contained can be learned by directly measuring the temperature in the space of the container. However, if the container has a size as described in Examples appearing later, its temperature becomes nearly equal to the heating temperature of the carbon furnace. Therefore, the wall temperature of the carbon furnace which is the heating source may be controlled as the temperature of the atmosphere.

In the invention, the temperature of the non-oxidizing atmosphere is elevated in the container in which the AlN sintered body is held and when the temperature of the atmosphere has reached the above-mentioned temperature region for heat treatment, the non-oxidizing atmosphere is changed over to the oxidizing atmosphere to effect the heat treatment. Though there is no particular limitation, the temperature in this case is elevated at a rate of, usually, 5° C./min. to 20° C./min.

When the temperature of the atmosphere has reached the temperature region for treat treatment, the non-oxidizing atmosphere can be changed over to the oxidizing atmosphere by introducing an oxidizing gas such as oxygen gas into the container in which the AlN sintered body is contained and substituting the oxidizing gas for the non-oxidizing atmosphere. This means, however, necessitates a pipe for introducing the oxidizing gas into the container in the carbon furnace and a pipe for exhausting the non-oxidizing gas, causing the structure of the container to become complex. Desirably, therefore, an oxygen feed source that releases oxygen in the above temperature region for heat treatment is made present in the container together with the AlN sintered body in the same manner as the above-mentioned carbon source.

The oxygen feed source is a compound which does not release oxygen in a temperature region lower than 1400° C., but releases oxygen in the temperature region for heat treatment (1400 to 2000° C. and, particularly, 1600 to 1800° C.) under an oxygen partial pressure of lower than $10^{-4}$ Pa in the container, and elevates the oxygen partial pressure. Concretely, there can be used at least one inorganic oxide selected from the group consisting of yttrium aluminate, magnesium oxide and alumina. The oxygen feed source may assume any form like the above-mentioned carbon feed source and is, usually, disposed in the container in such an amount that can maintain the oxygen partial pressure of not lower than $10^{-4}$ Pa in the container during the heat treatment.

In the oxidizing atmosphere formed as described above in the invention, the AlN sintered body is held in the temperature region for heat treatment of 1400 to 2000° C. and, particularly, 1600 to 1800° C., whereby oxygen diffuses in the AlN sintered body and solidly dissolves in the AlN crystal particles making it possible to obtain a reformed AlN sintered body having a high light transmission property. Namely, it is presumed that as oxygen solidly dissolves due to the heat treatment, defects in the crystal particles are transformed from the form of absorbing visible light into the form that does not absorb visible light and, therefore, light transmission property, particularly, for visible light is enhanced.

According to the present invention, the oxygen concentration in the AlN sintered body increases through the above heat treatment. In particular, the heat treatment should be conducted for such a period of time that the oxygen concentration increases by not less than 0.03% by weight. That is, the oxygen concentration increases accompanying the heat treatment. Accompanying an increase in the oxygen concentration, further, oxygen solidly dissolves in an increased amount in the crystal particles. As a result, defects are transformed much to exhibit improved light transmission property. If the time for heat treatment is short and the oxygen concentration does not fully increase, therefore, oxygen solidly dissolves in decreased amounts. Accordingly, defects are not fully transformed and light transmission property is not fully improved. The time for heat treatment for increasing the oxygen concentration in the above range varies depending upon the oxygen partial pressure in the oxidizing atmosphere and the temperature for heat treatment, and must exactly be determined in advance through experiment. Usually, however, the oxygen concentration fully increases if the heat treatment is conducted for not less than 1 hour and, particularly, for not less than 3 hours, and oxygen solidly dissolves in increased amounts reliably improving transmission property, particularly, for visible light.

According to the present invention as will be understood from the above description, the transmission factor is improved, particularly, for visible light due to the heat treatment. As shown in Examples appearing later, the visible light transmission factor is represented by the total light transmission factor over a wavelength region of 300 to 800 nm. According to the present invention, the heat treatment is continued even after the oxygen concentration has increased by 0.3% by weight to grow AlN crystal particles. Therefore, the rectilinear light transmission factor can be improved without lowering the total light transmission factor. That is, as the particle diameter of the crystal particles increases, the frequency of refraction decreases on the grain boundaries when the ray of light transmits through the sintered body, and the ratio of light transmitting through straight increases. For example, upon growing the AlN crystal particles to possess an average particle diameter of not smaller than 35 µm, the rectilinear light transmission factor can be very increased. For instance, the time for heat treatment necessary for growing the AlN crystal particles to possess an average particle diameter of not smaller than 35 µm is, usually, not less than 100 hours though it may vary depending upon the heat-treating conditions and the size of the AlN crystal particles in the AlN sintered body put to the heat treatment. After the heat-treating time of about 300 hours, growth of the crystal particles reaches its limit.

After the heat treatment, the AlN sintered body is no longer heated but is cooled down to room temperature, and a reformed AlN sintered body having improved light transmission property is taken out from the container. In this case, there is no particular limitation on the rate of cooling the temperature. Usually, however, the temperature is lowered by leaving the AlN sintered body to cool.

At the time of lowering the temperature, too, it is necessary to prevent the reformed AlN sintered body from coming in contact with oxygen in a temperature region of lower than 1400° C. but not lower than 600° C. This is because $Al_2O_3$ that is formed may cause scattering to deteriorate the light transmission property. Here, when the oxidizing atmosphere is formed by using the above-mentioned oxygen-releasing compound, the oxygen partial pressure in the atmosphere decreases accompanying a decrease in the temperature, and there is no problem since no $Al_2O_3$ is formed. When the oxidizing atmosphere is formed by introducing the oxidizing gas, however, the atmosphere must be substituted with a non-oxidizing gas such as inert gas at the time of lowering the temperature.

<Reformed Aluminum Nitride Sintered Body>

The thus obtained reformed aluminum sintered body has a relative density of not less than 95%, has a concentration of metal impurities suppressed to be not more than 150 ppm, has an increased oxygen concentration due to the heat treatment described above and, therefore, has an oxygen concentration that is increased by at least 0.3% by weight or more exhibiting improved visible light transmission property. The reformed aluminum nitride sintered by the above method has the total light transmission factor of not less than 67% in the wavelength region of 300 to 800 nm as measured in the form of a flat plate having a thickness of 0.6 mm. When measured in the form of a cylinder having the same thickness, further, the total light transmission factor over the wavelength region of 300 to 800 nm, usually, reaches not less than 95% though it may vary depending upon the diameter.

Among the above reformed aluminum sintered bodies, in particular, the one having an oxygen concentration of not less than 0.08% by weight can be obtained by using a starting AlN sintered body having a high oxygen concentration offering a great industrial value such as enabling the cost to be greatly decreased. The reformed aluminum nitride sintered body that exhibits the above excellent light transmission property despite containing oxygen at such a high concentration, has not heretofore been known, and is very useful.

Further, the sintered body in which the AlN crystal particles are assuming an average diameter of not smaller than 35 µm due to the heat treatment conducted for particularly long periods of time, exhibits a high total light transmission factor as described above as well as a high rectilinear light transmission factor, i.e., a rectilinear light transmission factor of not less than 10% as measured in the form of a flat plate having a thickness of 0.3 mm.

The above reformed aluminum nitride sintered body, usually, has a heat conductivity of 100 to 220 W/m·k.

The reformed aluminum nitride sintered body of the invention assumes various shapes depending upon the use, and can be used in any shape such as cylinder (tube), flat plate (board), curved surface, sphere, oval sphere, cup or bowl.

In particular, when the aluminum nitride sintered body of the invention is used as covers for light sources such as light-emitting tube, lamp, etc. by utilizing its excellent light transmission property, the shapes may be suitably determined depending upon the structures of such lamps.

EXAMPLES

The method of the present invention will now be concretely described below byway of Examples to which only, however, the invention is in no way limited.

In the following Examples and Comparative Examples, various properties were measured by the methods described below.

(1) Concentration of Metal Impurities.

The aluminum nitride sintered body was pulverized into a powder and was melted in an acid, and the concentration of impurity metal elements excluding aluminum was determined by the ICP emission analysis of a solution thereof by using the "ICP-1000" manufactured by Shimazu Seisakusho Co.

The aluminum nitride sintered body was pulverized into a powder and was burned in an oxygen stream by using the "EMIR-110" manufactured by Horiba Seisakusho Co., and the carbon concentration was determined from the amounts of CO and $CO_2$ gases that were generated.

Impurities in the aluminum nitride powder were determined by applying the operation after the above pulverization.

(2) Oxygen Concentration.

The surfaces of the aluminum nitride sintered body were polished and were pulverized into a powder. Thereafter, the oxygen concentration was found from the amount of CO gas that was generated relying on the high-temperature thermal analytical method in a graphite crucible by using the "EMGA-2800" manufactured by Horiba Seisakusho Co.

(3) Total Light Transmission Factor (Flat Plate).

The aluminum nitride sintered body was machined into a shape of a diameter of 30 mm and a thickness of 0.6 mm, and the light transmission factor of the aluminum nitride sintered body of the shape of a flat plate was measured by using visible light in a wavelength region of 300 to 800 nm by using the "HZ-1" manufactured by Suga Shikenki Co.

(4) Total Light Transmission Factor (Cylinder).

Figure 1:
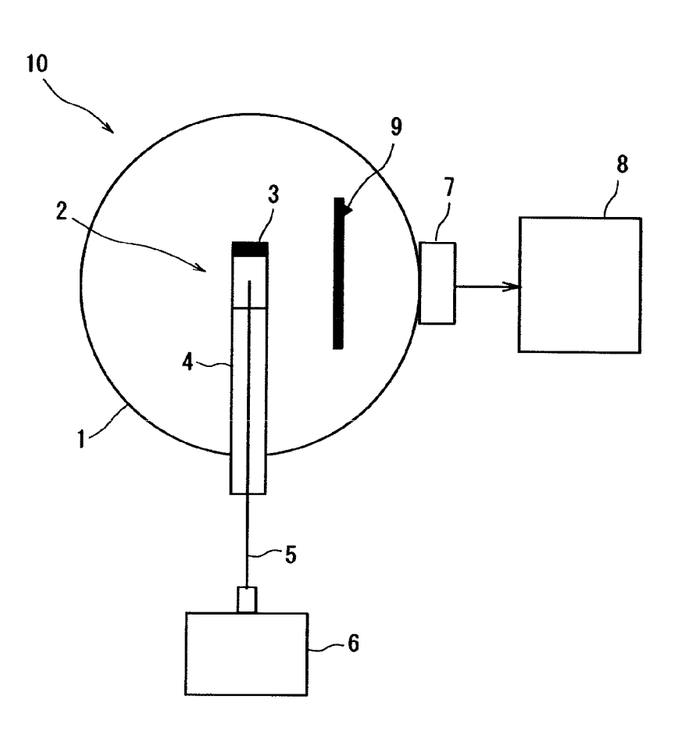
[FIG. 1] is a view schematically illustrating an apparatus for measuring a sintered body of a cylindrical shape for its total light transmission factor.

By using an apparatus 10 for measuring the light transmission factor as shown in FIG. 1, the aluminum nitride of a tubular shape was measured for its total light transmission factor for visible light of wavelengths of 300 nm to 800 nm.

That is, visible light emitted from a light source 6 was introduced through an optical fiber 5 into a sample tube with a cap 3, and the light transmission factor was calculated from the quantity of light leaked through the outer wall of the sample tube. The apparatus 10 for measuring the light transmission factor includes, as shown in FIG. 1, an integrating sphere 1, a sample support portion 4, a detector 7, a display unit 8 and a buffer board 9.

(5) Heat Conductivity.

Measured relying on the laser-flash method by using a heat constant-measuring apparatus, PS-7, manufactured by Rigaku Denki Co. The thickness correction was attained by using a calibration curve.

(6) Relative Density.

The density of the aluminum nitride sintered body was found relying on the Archimedes' method by using a high-precision gravimeter, D-H (trade name, manufactured by Toyo Seiki Co.). A relative density was found by dividing a value of density that was found by a theoretical density of the aluminum nitride, i.e., 3.260 g/cm$^3$.

(7) Rectilinear Light Transmission Factor.

The aluminum nitride sintered body was machined into the shape of a diameter of 30 mm and a thickness of 0.3 mm. By using UV-VIS, the light transmission factor of the aluminum nitride sintered body was measured with light of a wavelength of 600 nm.

(8) SEM Observation.

First, a sample of the sintered body that was obtained was broken in a direction nearly perpendicular to the surface of the sintered body. Cross section of the broken surface of the sample was observed by using a scanning electron microscope (SEM), S-2600N (trade name, manufactured by Hitachi, Ltd.). The magnification was so that that 100 to 300 crystal particles of the aluminum nitride were included in a screen being observed, and a secondary electron image thereof was photographed.

From the SEM photograph of the micro structure of the above sintered body, an average crystal particle diameter was found relying on the code method.

Example 1

The following aluminum nitride powder was provided.
Aluminum nitride powder:
Average particle diameter; 1.3 μm
BET specific surface area; 3.39 m$^2$/g
Oxygen concentration; 0.8% by weight
Metal element concentration (excluding Al); 35 ppm Into a nylon pot having a volume of 0.3 liters, there were introduced nylon balls of a diameter of 10 mm obtained by coating iron cores with a nylon, 100 parts by weight of the aluminum nitride powder, 5 parts by weight of a sintering additive powder (3CaO·Al$_2$O$_3$) and 40 parts by weight of a solvent (ethanol), which were wet-mixed together.

The obtained mixture was dried at 120° C. and was pulverized. The pulverized product was classified by using a stainless steel sieve (perforation size, 200 mm) to obtain a mixed powder for molding.

The above mixed powder for molding in an amount of 10 g was false-molded into a molded body of a diameter of 40 mm and a thickness of 6 mm by using a monoaxial molding machine and was, thereafter, molded by using a CIP molding machine under a load of 3 t/cm$^2$.

The molded body obtained through the above operation was placed in a container made of the aluminum nitride incorporating a carbon board therein, and a plate made of the boron nitride was placed between the carbon plate and the molded body so that they did not come in contact with each other.

The molded body contained in the aluminum nitride container was fired in a reducing atmosphere at 1880° C. for 30 hours to obtain a starting aluminum nitride sintered body that was to be heat-treated.

Table 1 shows the concentration of metal impurities, oxygen concentration, relative density, average crystal particle diameter of the obtained sintered body, the total light transmission factor thereof in the form of a plate, and the production conditions.

In Table 1, C3A stands for 3CaO·Al$_2$O$_3$.

Next, the following alumina was provided as an oxygen-releasing material.

Alumina:
Oxygen partial pressure at lower than 1400° C.; 10$^{-4}$ Pa or lower
Oxygen partial pressure at 1400° C. to 2000° C.; 1×10$^{-1}$ Pa or higher The AlN sintered body obtained above was set in a container (64 mm wide, 64 mm long, 20 mm high) made of AlN having gas permeability shown in Table 2 and equipped with a lid together with 1 g of the above alumina (oxygen-releasing material). Table 2, further, shows surface roughness of the closely contacting surfaces of the lid and the container.

The above container was placed in a carbon furnace, and the interior of the carbon furnace was substituted with nitrogen to thereby simultaneously substitute the interior of the container with nitrogen. Thereafter, the temperature of the atmosphere (controlled by the wall temperature of the carbon furnace) was elevated at a rate of 10° C./min.

At a moment when the temperature of the atmosphere has reached 1880° C., the temperature was not elevated any further, and the heat treatment was conducted at this temperature for 30 hours.

Table 2 shows properties of the reformed aluminum nitride sintered body obtained by the above method. Table 2, further, shows production conditions (heat-treating conditions), too.

In this Example, the total light transmission factor was measured by using the plate. The same also holds in the following Examples 2 to 12 and Comparative Examples 1 to 5.

The reformed AlN sintered body was, further, measured for its rectilinear light transmission factor to be 3.9%.

Example 2

A starting AlN aluminum nitride sintered body was obtained through the same operation as that of Example 1 but adding the sintering additive in an amount of 1 part by weight and was, further, heat-treated under the same conditions as those of Example 1 to obtain a reformed AlN sintered body.

Tables 1 and 2 show properties of the starting AlN aluminum nitride sintered body, properties of the reformed AlN sintered body and the production conditions.

Example 3

A reformed AlN sintered body was obtained through the same operation as that of Example 1 but heat-treating the starting AlN aluminum nitride sintered body for 5 hours. Tables 1 and 2 show properties of the starting AlN sintered body, properties of the reformed AlN sintered body and the production conditions.

Example 4

A YAG($3Y_2O_3 \cdot 5Al_2O_3$) having the following properties was provided as an oxygen-releasing material.
  Oxygen partial pressure at lower than 1400° C.; $10^{-4}$ Pa or lower
  Oxygen partial pressure at 1400° C. to 2000° C.; $1 \times 10^{-1}$ Pa or higher A reformed AlN sintered body was obtained through the same operation as in Example 1 but heat-treating the starting AlN aluminum nitride sintered body at a temperature of 1690° C. for a heat-treating time of 100 hours, and changing the oxygen-releasing material from the alumina into the YAG. Tables 1 and 2 show properties of the starting AlN sintered body, properties of the reformed AlN sintered body and the production conditions.

Example 5

A $Y_2A$ ($2Y_2O_3 \cdot Al_2O_3$) having the following properties was provided as an oxygen-releasing material.
  Oxygen partial pressure at lower than 1400° C.; $10^{-4}$ Pa or lower
  Oxygen partial pressure at 1400° C. to 2000° C.; $1 \times 10^{-3}$ Pa or higher A reformed AlN sintered body was obtained through the same operation as in Example 4 but using the $Y_2A$ as the oxygen-releasing material. Tables 1 and 2 show properties of the starting AlN sintered body, properties of the reformed AlN sintered body and the production conditions.

Example 6

A YA ($Y_2O_3 \cdot Al_2O_3$) having the following properties was provided as an oxygen-releasing material.
  Oxygen partial pressure at lower than 1400° C.; $10^{-4}$ Pa or lower
  Oxygen partial pressure at 1400° C. to 2000° C.; $1 \times 10^{-3}$ Pa or higher A reformed AlN sintered body was obtained through the same operation as in Example 4 but using the YA as the oxygen-releasing material. Tables 1 and 2 show properties of the starting AlN sintered body, properties of the reformed AlN sintered body and the production conditions.

Example 7

An yttrium oxide having the following properties was provided as an oxygen-releasing material.
  Oxygen partial pressure at lower than 1400° C.; $10^{-4}$ Pa or lower
  Oxygen partial pressure at 1400° C. to 2000° C.; $1 \times 10^{-3}$ Pa or higher A reformed AlN sintered body was obtained through the same operation as in Example 4 but using the yttrium oxide as the oxygen-releasing material. Tables 1 and 2 show properties of the starting AlN sintered body, properties of the reformed AlN sintered body and the production conditions.

Example 8

A magnesium oxide having the following properties was provided as an oxygen-releasing material.
  Oxygen partial pressure at lower than 1400° C.; $10^{-4}$ Pa or lower
  Oxygen partial pressure at 1400° C. to 2000° C.; $1 \times 10^{-1}$ Pa or higher A reformed AlN sintered body was obtained through the same operation as in Example 4 but using the magnesium oxide as the oxygen-releasing material. Tables 1 and 2 show properties of the starting AlN sintered body, properties of the reformed AlN sintered body and the production conditions.

Example 9

A reformed AlN sintered body was obtained through the same operation as in Example 4 but using, as the oxygen-releasing material, the alumina like in Example 1. Tables 1 and 2 show properties of the starting AlN sintered body, properties of the reformed AlN sintered body and the production conditions.

Example 10

A reformed AlN sintered body was obtained through the same operation as in Example 1 but heat-treating the starting AlN aluminum nitride sintered body at a temperature of 1480° C. for a heat-treating time of 5 hours, and using magnesium oxide as the oxygen-releasing material. Tables 1 and 2 show properties of the starting AlN sintered body, properties of the reformed AlN sintered body and the production conditions.

Example 11

Into a nylon pot having a volume of 50 liters, there were introduced nylon balls (diameter of 10 mm) obtained by coating iron cores with a nylon, 100 parts by weight of the aluminum nitride powder (used in Example 1), 5 parts by weight of a sintering additive powder ($3CaO \cdot Al_2O_3$), 4 parts by weight of an organic binder (acryl) and 120 parts by weight of an organic solvent (toluene), which were wet-mixed together. The above mixture was spray-dried to obtain granules (composition for molding).

The above granules in an amount of 10 g were false-molded into a molded body of a diameter of 40 mm and a thickness of 6 mm by using a monoaxial molding machine and was, thereafter, molded by using a CIP molding machine under a load of 3 t/cm².

The obtained molded body was dewaxed in the open air at a dewaxing temperature of 530° C. for 4 hours to obtain a dewaxed molded body containing residual carbon in an amount of 500 ppm.

By using the thus obtained dewaxed molded body, a starting AlN sintered body was obtained through the same operation as in Example 1, and was heat-treated in the same manner as in Example 1 to obtain a reformed AlN sintered body. Tables 1 and 2 show properties of the starting AlN sintered body, properties of the reformed AlN sintered body and the production conditions.

Example 12

A reformed AlN sintered body was obtained through the same operation as in Example 1 but heat-treating the starting AlN sintered body for 270 hours. Tables 1 and 2 show properties of the starting AlN sintered body, properties of the reformed AlN sintered body and the production conditions.

The reformed AlN sintered body was measured for its rectilinear light transmission factor to be 13.5% which was a remarkable improvement as compared to Example 1.

From the results of Tables 1 and 2, it will be learned that the total light transmission factors in the form of plates are improved by 1.7% to 4.5% in the above Examples 1 to 12.

Comparative Example 1

A starting AlN sintered body was obtained without quite using a sintering additive and conducting the heat treatment at a temperature of 1850° C. for 8 hours. The AlN sintered body possessed an oxygen concentration of 0.59% by weight, a concentration of metal impurities of 265 ppm and a total light transmission factor (plate) of 26.3%.

The above starting AlN sintered body was heat-treated in the same manner as in Example 1 to obtain a reformed AlN sintered body. Tables 1 and 2 show properties of the starting AlN sintered body, properties of the reformed AlN sintered body and the production conditions.

Comparative Example 2

A reformed AlN sintered body was obtained in the same manner as in Example 1 but heat-treating the starting AlN sintered body at a temperature of 1200° C. for a heat-treating time of 5 hours. Tables 1 and 2 show properties of the starting AlN sintered body, properties of the reformed AlN sintered body and the production conditions.

Comparative Example 3

A reformed AlN sintered body was obtained by conducting the heat treatment in the same manner as in Example 1 but without placing the oxygen-releasing material in the container. Tables 1 and 2 show properties of the starting AlN sintered body, properties of the reformed AlN sintered body and the production conditions.

Comparative Example 4

A reformed AlN sintered body was obtained by conducting the heat treatment in the same manner as in Example 1 but changing the jig used for separating the starting AlN sintered body from the oxygen-releasing material into the one having a gas permeability of $0.08 \times 10^{-6}$ mol/m²·s·Pa. Tables 1 and 2 show properties of the starting AlN sintered body, properties of the reformed AlN sintered body and the production conditions.

Comparative Example 5

A reformed AlN sintered body was obtained by conducting the heat treatment in the same manner as in Example 1 but setting the surface roughness to be 5 μm on the sealing surface of the container that contained the starting AlN sintered body. Tables 1 and 2 show properties of the starting AlN sintered body, properties of the reformed AlN sintered body and the production conditions.

The aluminum nitride sintered bodies obtained in the above Examples and Comparative Examples possessed relative densities and concentrations metal impurities that were the same as those of the primary aluminum nitride sintered bodies thereof.

TABLE 1

| | Starting aluminum nitride sintered body | | | |
|---|---|---|---|---|
| | Production method | | | |
| | Sintering additive | Added amount (pts) | Firing temp. (° C.) | Firing time (hrs) |
| Ex. 1 | C3A | 5 | 1880 | 30 |
| Ex. 2 | C3A | 1 | 1880 | 30 |
| Ex. 3 | C3A | 5 | 1880 | 30 |
| Ex. 4 | C3A | 5 | 1880 | 30 |
| Ex. 5 | C3A | 5 | 1880 | 30 |
| Ex. 6 | C3A | 5 | 1880 | 30 |
| Ex. 7 | C3A | 5 | 1880 | 30 |
| Ex. 8 | C3A | 5 | 1880 | 30 |
| Ex. 9 | C3A | 5 | 1880 | 30 |
| Ex. 10 | C3A | 5 | 1880 | 30 |
| Ex. 11 | C3A | 5 | 1880 | 30 |
| Ex. 12 | C3A | 5 | 1880 | 30 |
| Comp. Ex. 1 | — | — | 1850 | 8 |
| Comp. Ex. 2 | C3A | 5 | 1880 | 30 |
| Comp. Ex. 3 | C3A | 5 | 1880 | 30 |
| Comp. Ex. 4 | C3A | 5 | 1880 | 30 |
| Comp. Ex. 5 | C3A | 5 | 1880 | 30 |

| | Properties | | | | |
|---|---|---|---|---|---|
| | Oxygen concentration (%) | Metal concentration (ppm) | Relative density (%) | Ave. crystal particle diameter (μm) | Total light transmission factor (%) |
| Ex. 1 | 0.07 | <100 | 99 | 10 | 66.3 |

TABLE 1-continued

| | \multicolumn{5}{c}{Starting aluminum nitride sintered body} | | | | |
|---|---|---|---|---|---|
| Ex. 2 | 0.13 | <100 | 99 | 13 | 63.5 |
| Ex. 3 | 0.08 | <100 | 99 | 11 | 66.3 |
| Ex. 4 | 0.08 | <100 | 99 | 11 | 65.3 |
| Ex. 5 | 0.08 | <100 | 99 | 12 | 66.3 |
| Ex. 6 | 0.08 | <100 | 99 | 10 | 66.0 |
| Ex. 7 | 0.08 | <100 | 99 | 11 | 65.2 |
| Ex. 8 | 0.08 | <100 | 99 | 11 | 66.3 |
| Ex. 9 | 0.08 | <100 | 99 | 12 | 66.0 |
| Ex. 10 | 0.06 | <100 | 99 | 10 | 66.3 |
| Ex. 11 | 0.06 | <100 | 99 | 11 | 65.8 |
| Ex. 12 | 0.06 | <100 | 99 | 12 | 65.1 |
| Comp. Ex. 1 | 0.59 | 265 | 99 | 13 | 26.3 |
| Comp. Ex. 2 | 0.05 | <100 | 99 | 11 | 66.3 |
| Comp. Ex. 3 | 0.06 | <100 | 99 | 12 | 65.1 |
| Comp. Ex. 4 | 0.06 | <100 | 99 | 11 | 65.1 |
| Comp. Ex. 5 | 0.06 | <100 | 99 | 11 | 65.1 |

TABLE 2

Reformed aluminum nitride sintered body

| | Production method | | | | |
|---|---|---|---|---|---|
| | Heat-treating temp. (° C.) | Heat-treating time (hrs) | Oxygen-releasing material | Gas permeability of jig ($\times 10^6$ mol/m$^2$ · s · Pa) | Ra of contacting surfaces of lid and main body (μm) |
| Ex. 1 | 1880 | 30 | alumina | 0.05 | <2 |
| Ex. 2 | 1880 | 30 | alumina | 0.05 | <2 |
| Ex. 3 | 1880 | 5 | alumina | 0.05 | <2 |
| Ex. 4 | 1690 | 100 | YAG | 0.05 | <2 |
| Ex. 5 | 1690 | 100 | Y2A | 0.05 | <2 |
| Ex. 6 | 1690 | 100 | YA | 0.05 | <2 |
| Ex. 7 | 1690 | 100 | yttrium oxide | 0.05 | <2 |
| Ex. 8 | 1690 | 100 | magnesium oxide | 0.05 | <2 |
| Ex. 9 | 1690 | 100 | alumina | 0.05 | <2 |
| Ex. 10 | 1480 | 5 | magnesium oxide | 0.05 | <2 |
| Ex. 11 | 1880 | 30 | alumina | 0.05 | <2 |
| Ex. 12 | 1880 | 270 | alumina | 0.05 | <2 |
| Comp. Ex. 1 | 1880 | 30 | alumina | 0.05 | <2 |
| Comp. Ex. 2 | 1200 | 5 | alumina | 0.05 | <2 |
| Comp. Ex. 3 | 1800 | 30 | none | 0.05 | <2 |
| Comp. Ex. 4 | 1880 | 30 | alumina | 0.08 | <2 |
| Comp. Ex. 5 | 1880 | 30 | alumina | 0.05 | 5.2 |

| | Properties | | | |
|---|---|---|---|---|
| | Total light transmission factor (%) | Oxygen concentration (%) | Ave. crystal particle diameter (μm) | Heat conductivity (W/m · K) |
| Ex. 1 | 68.3 | 0.13 | 15 | 193 |
| Ex. 2 | 68.0 | 0.30 | 16 | 141 |
| Ex. 3 | 68.3 | 0.10 | 14 | 198 |
| Ex. 4 | 69.3 | 0.11 | 13 | 205 |
| Ex. 5 | 68.0 | 0.12 | 13 | 203 |
| Ex. 6 | 69.7 | 0.12 | 13 | 200 |
| Ex. 7 | 68.8 | 0.11 | 12 | 200 |
| Ex. 8 | 69.3 | 0.11 | 14 | 198 |
| Ex. 9 | 68.3 | 0.11 | 14 | 199 |
| Ex. 10 | 69.0 | 0.09 | 11 | 205 |
| Ex. 11 | 68.3 | 0.12 | 16 | 190 |
| Ex. 12 | 68.0 | 0.45 | 40 | 102 |
| Comp. Ex. 1 | 35.4 | 0.69 | 13 | 77 |
| Comp. Ex. 2 | 66.5 | 0.07 | 12 | 210 |
| Comp. Ex. 3 | 65.0 | 0.06 | 13 | 215 |
| Comp. Ex. 4 | 65.0 | 0.06 | 11 | 214 |
| Comp. Ex. 5 | 65.0 | 0.06 | 12 | 215 |

Example 13

The aluminum nitride powder, sintering additive powder ($3CaO \cdot Al_2O_3$), organic binder and organic solvent were wet-mixed, and were spray-dried in quite the same manner as in Example 11 to prepare a granular composition for molding.

The granular composition was injection-molded to prepare a cylindrical molded body having a thickness of 0.6 mm (diameter of 10 mm).

The molded body was dewaxed in the open air at a dewaxing temperature of 530° C. for 4 hours to obtain a dewaxed molded body containing residual carbon in an amount of 530 ppm.

The dewaxed body obtained through the above operation was fired through the same operation as in Example 1 to obtain a starting AlN sintered body.

The sintered body possessed an oxygen concentration of 0.10% by weight, a metal concentration (excluding Al) of less than 100 ppm, a relative density of 99% and a total light transmission factor in the form of a cylinder of 41.8%.

Next, the above AlN sintered body was heat-treated under quite the same conditions as those in Example 1 to obtain a reformed AlN sintered body.

The reformed AlN sintered body possessed an oxygen concentration of 0.40% by weight, a metal concentration (excluding Al) of less than 100 ppm, a relative density of 99% and a total light transmission factor in the form of a cylinder of 97.8% which was a striking improvement.

Example 14

A reformed AlN sintered body was obtained in the same manner as in Example 13 but heat-treating the starting AlN sintered body for 10 hours.

The reformed AlN sintered body possessed an oxygen concentration of 0.20% by weight, a metal concentration (excluding Al) of less than 100 ppm, a relative density of 99% and a total light transmission factor in the form of a cylinder of 96.0% which was a striking improvement, too.

The invention claimed is:

1. A reformed aluminum nitride sintered body having a concentration of metal impurities of not more than 150 ppm, an oxygen concentration in a range of 0.09% to 0.45% by weight, a relative density of not less than 95%, a total light transmission factor over a wavelength region of 300 to 800 nm of not less than 67% as measured as a flat plate having a thickness of 0.6 mm, and a rectilinear light transmission factor of not less than 10% for light having a wavelength of 600 nm as measured as a flat plate having a thickness of 0.3 mm.

2. The reformed aluminum nitride sintered body according to claim 1, having an average crystal particle diameter of not less than 35 μm.

* * * * *